US011531711B1

(12) United States Patent
Molina (10) Patent No.: US 11,531,711 B1
(45) Date of Patent: Dec. 20, 2022

(54) FORENSIC CRIMINAL INVESTIGATION DIGITAL DATA INTERSECTION

(71) Applicant: Radix Metasystems, Inc., Aurora, CO (US)

(72) Inventor: Peter R. Molina, Lakewood, CO (US)

(73) Assignee: Nighthawk.Cloud Inc., Aurora, CO (US)

( * ) Notice: Subject to any disclaimer, the term of this patent is extended or adjusted under 35 U.S.C. 154(b) by 0 days.

(21) Appl. No.: 17/539,165

(22) Filed: Nov. 30, 2021

(51) Int. Cl.
*G06F 16/00* (2019.01)
*G06F 16/9038* (2019.01)
*G06F 16/909* (2019.01)
*G06F 16/9035* (2019.01)

(52) U.S. Cl.
CPC ........ *G06F 16/9038* (2019.01); *G06F 16/909* (2019.01); *G06F 16/9035* (2019.01)

(58) Field of Classification Search
CPC .................................................. G06F 16/9035
See application file for complete search history.

(56) References Cited

U.S. PATENT DOCUMENTS

2011/0295886 A1\* 12/2011 Bousquet ............ G06F 16/2465
707/E17.069

\* cited by examiner

*Primary Examiner* — Ajith Jacob (57) ABSTRACT

Systems and methods are disclosed for finding intersections between digital interactions of two users (or a user and specific data) based on two different digital interaction data sets. For example, a digital interaction database may include a first user's mobile phone records from a first mobile company and a second user's mobile phone records from a second mobile phone company. The first user's mobile phone records and the second user's mobile phone records may be organized differently, may have different data elements, may have different format styles, etc. Yet an intersection between the first user and the second user may be found by searching the first user's mobile phone records and/or the second user's mobile phone records and retrieving related digital interactions such as, for example, phone records showing a phone call or message between the first user and the second user.

19 Claims, 6 Drawing Sheets

| ID | Type | Data Set | Start Time | End Time | Duration | Sender | Reciever | Location |
|----|------|----------|------------|----------|----------|--------|----------|----------|
| 445 | Call | First | 4/11/14 22:15 | 4/11/14 22:18 | 3 mins | First user | Second user | |
| 322 | Message | Second | 4/10/14 23:33 | 4/10/14 23:34 | 6 s | Second user | First user | |
| 13 | License plate | LP Reader | 4/11/14 22:13 | . | . | . | . | 39.740209,-104.865939 |

FORENSIC CRIMINAL INVESTIGATION DIGITAL DATA INTERSECTION

BACKGROUND

Modern forensic criminal investigation techniques often use cell phone data and/or other digital data to track a person of interest's activity and/or to determine whom a person of interest has interacted. Digital interaction records can come from a variety of sources, have a different data structures, include different data, etc.

SUMMARY

Systems and methods are disclosed for finding intersections between digital interactions of two users (or a user and specific data) based on two different digital interaction data sets. For example, a digital interaction database may include a first user's mobile phone records from a first mobile company and a second user's mobile phone records from a second mobile phone company. The first user's mobile phone records and the second user's mobile phone records may be organized differently, may have different data elements, may have different format styles, etc. Yet an intersection between the first user and the second user may be found by searching the first user's mobile phone records and/or the second user's mobile phone records and retrieving related digital interactions such as, for example, phone records showing a phone call or message between the first user and the second user.

For example, a computer implemented method for forensic criminal investigation is disclosed. The method may include maintaining in a digital interaction database a first input file comprising a first plurality of digital records of interaction between a first identifier associated with a first individual and a first plurality identifiers associated with a first plurality of individuals, the first plurality of digital records having been recorded by a first provider. The method may also include maintaining in the digital interaction database a second input file comprising a second plurality of digital records of interaction between a second identifier associated with a second individual and a second plurality of identifiers associated with a second plurality individuals, the second plurality of digital records having been recorded by a second provider, the second provider being different and distinct from the first provider. The method may also include searching for an intersection between the second identifier and an identifier in the first plurality of identifiers and establishing a first digital interaction between the first individual and the second individual based on an intersection between the second identifier and an identifier of the first plurality of identifiers.

The method, for example, may also include creating a graphical representation comprising information about the first digital interaction between the first individual and the second individual.

The method, for example, may also include establishing a second digital interaction between the first individual and the second individual based on an intersection between the second identifier and an identifier of the first plurality of identifiers, wherein the second digital interaction is a different type of digital interaction; and creating a graphical representation comprising information about the second digital interaction that includes the type of digital interaction of the second digital interaction.

The information about the first digital interaction may, for example, include information selected from the group consisting of a. first digital interaction type, a first digital interaction duration, time of the first digital interaction, the second identifier, the first identifier, and first digital interaction location.

The first digital interaction, for example, may include a digital interaction selected from the group consisting of phone call, a text message, a text message, an email, an instant message, and a Facebook message.

The first input file, for example, may be organized differently than the second input file. The first input file, for example, may include data that is not included in the second input file. The first input file and/or the second input file may include cell phone records. The first input file and/or the second input file comprises social media records.

The first input file and/or the second input file, for example, may include a plurality of records, each of the plurality or records including one or more of the following: an interaction date, an interaction time, a sender name, a sender ID, a sender phone number, a sender email address, a sender username, a receiver name, a receiver ID, a receiver phone number, a receiver email address, a receiver username, a GPS location of the sender, a GPS location of the receiver, a tower location of the sender, a tower location of the receiver, a tower identifier of the sender, a tower identifier of the receiver, and interaction content.

A computing cloud for forensic criminal investigation is also disclosed. The computing cloud may include at least one data storage unit and at least one memory device configured to store instructions. The computer processing unit may be configured (or programed) to execute the instructions. The computing cloud, for example, may maintain in a digital interaction database stored in the data storage unit a first input file comprising a first plurality of digital records of interaction between a first identifier associated with a first individual and a first plurality identifiers associated with a first plurality of individuals, the first plurality of digital records having been recorded by a first provider. The computing cloud, for example, may maintain in the digital interaction database a second input file comprising a second plurality of digital records of interaction between a second identifier associated with a second individual and a second plurality of identifiers associated with a second plurality individuals, the second plurality of digital records having been recorded by a second provider, the second provider being different and distinct from the first provider. The computing cloud, for example, may search for an intersection between the second identifier and an identifier in the first plurality of identifiers. The computing cloud, for example, may establish a first digital interaction between the first individual and the second individual based on an intersection between the second identifier and an identifier of the first plurality of identifiers.

The computing cloud, for example, may create a graphical representation comprising information about the first digital interaction between the first individual and the second individual.

The information about the first digital interaction, for example, may include information selected from the group consisting of a. first digital interaction type, a first digital interaction duration, time of the first digital interaction, the second identifier, the first identifier, and first digital interaction location.

The first digital interaction, for example, may include a digital interaction selected from the group consisting of phone call, a text message, a text message, an email, an instant message, and a Facebook message.

The first input file, for example, may be organized differently than the second input file. The first input file, for example, may include data that is not included in the second input file. The first input file and/or the second input file, for example, may include cell phone records. The first input file and/or the second input file, for example, may include social media records.

The first input file and/or the second input file, for example, may include a plurality of records, each of the plurality or records including one or more of the following: an interaction date, an interaction time, a sender name, a sender ID, a sender phone number, a sender email address, a sender username, a receiver name, a receiver ID, a receiver phone number, a receiver email address, a receiver username, a GPS location of the sender, a GPS location of the receiver, a tower location of the sender, a tower location of the receiver, a tower identifier of the sender, a tower identifier of the receiver, and interaction content.

The various embodiments described in the summary and this document are provided not to limit or define the disclosure or the scope of the claims.

DETAILED DESCRIPTION

Systems and methods for finding digital interation intersections between two users (or a user and specific data) based on two different digital interaction data sets. For example, in a forensic investigation it may be helpful to prove whether two individuals were in communication with each other or were geographically near each other at a given data and time. While digital interaction data sets may be available, it can be very difficult, if not impossible, for an investigator to find related digital interactions between data sets. This can be even more difficult if the two different data sets are from different providers that produce different types of data sets in different formats.

For example, a digital interaction database may include a first user's mobile phone records from a first mobile company and the digital interaction database may include a second user's mobile phone records from a second mobile phone company. The first and second mobile phone companies may be different. And the first user's mobile phone records and the second user's mobile phone records may be organized differently, may have different data elements, may have different format styles, etc. Yet an intersection between the first user and the second user may be found by searching the first user's mobile phone records and/or the second user's mobile phone records and retrieving related digital interactions such as, for example, phone records showing a phone call or message between the first user and the second user. In this example, these digital interactions may include a phone call, a text message, and/or a text message.

As another example, a digital interaction database may include a first user's mobile phone records, which may include GPS data specifying when and where the first user is located at various dates and times. The digital interaction database, for example, may also include license plate data (or GPS tracking data) for the second user's car at a various geolocations at a various time. An intersection may be found between the first user and the second user based on the geolocation and time data of the first user's mobile records and the second user's license plate data such as, for example, showing the first user and the second user in or around the same geolocation (e.g., within about 1, 0.75, 0.5, 0.25, 0.1 miles, etc., or within 1,000, 750, 500, 250, 100 feet etc.) or within about 0.1 miles to 5.0 miles, or 100 feet to 1,000 feet at the same time.

As another example, a digital interaction database may include Cellebrite data.

As another example, a digital interaction database may include a first user's mobile phone records that may include the content of text message (or an SMS message). The digital interaction database may also include a listing of keywords (or phrases) of interest (e.g., location specific gang related words, crime specific words, names of victims, names of suspects, location names, etc.). An intersection may be found between the content of the first user's mobile phone records and one or more keywords in the listing of keywords such as, for example, a match of one or more keywords and words found within the content of the first user's mobile phone records. Alternatively or additionally, the digital interaction database may include the content of a first user's email messages, social media posts, tweets, messenger messages, Snapchat messages, What's App messages, etc., etc.

Figure 1:
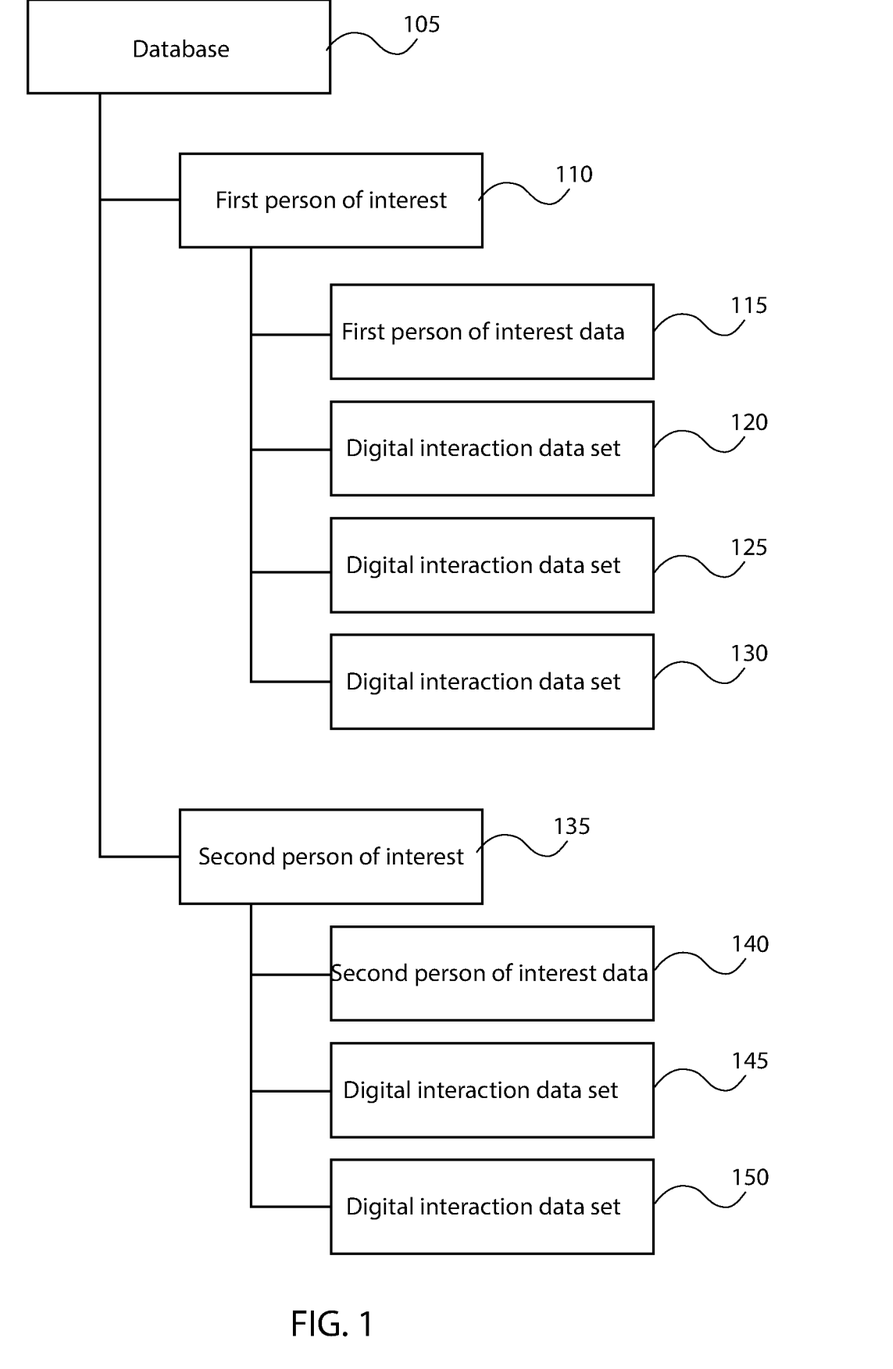
FIG. 1 is an example block diagram of a digital interaction database.

FIG. 1 is an example block diagram of a digital interaction database 105. The digital interaction database 105 may include the digital interactions for one person of interest (or individual) or a plurality of persons of interest (or individuals). A person of interest may include person of interest in an investigation such as, for example, suspects, victims, witness, defendant, associate, etc. In this specific example, the digital interaction database 105 includes data associated with at least two persons of interest: a first person of interest 110 and a second person of interest 135.

In this example, the first person of interest 110, may include first person of interest data 115. The first person of interest data 115 may include data about the first person of interest such as, for example, name, age, photograph(s), phone number, email address, address, social media ID, license plate, advertising id, other identifiers, etc.

In this example, the first person of interest 110, may include the first digital interaction data set 120, the first digital interaction data set 125, and the first digital interaction data set 130 (collectively, the first person of interest data sets). Other additional digital interaction data sets may also be uploaded and included with the first person of interest. The first person of interest data sets may include any digital interaction data set described in this document or other digital interaction data sets.

For example, the first digital interaction data set 120 may include a history of telephone records of the first person of interest to and from various other individuals. The first digital interaction data set 125 may include a history of text messages to and from the first person of interest to and from various other individuals. The first digital interaction data set 130 may include a history of digital interactions of the first person (e.g., posts, comments, images, videos, etc.) of interest on a social media platform.

In this example, the second person of interest 135, may include the second person of interest data 140. The second person of interest data 140 may include data about the first person of interest such as, for example, name, age, photograph(s), phone number, email address, address, social media ID, license plate, advertising id, other identifiers, etc.

In this example, the second person of interest 135, may include the second digital interaction data set 145 and the second digital interaction data set 150 (collectively, the second person of interest data sets). Other additional digital interaction data sets may also be uploaded and included with the second person of interest. The second person of interest data sets may include any digital interaction data set described in this document or other digital interaction data sets.

For example, the second digital interaction data set 120 may include a history of telephone records of the first person of interest to and from various other individuals. The second digital interaction data set 125 may include a history of text messages to and from the first person of interest to and from various other individuals. The second digital interaction data set 130 may include a history of digital interactions of the first person (e.g., posts, comments, images, videos, etc.) of interest on a social media platform.

Figure 2:
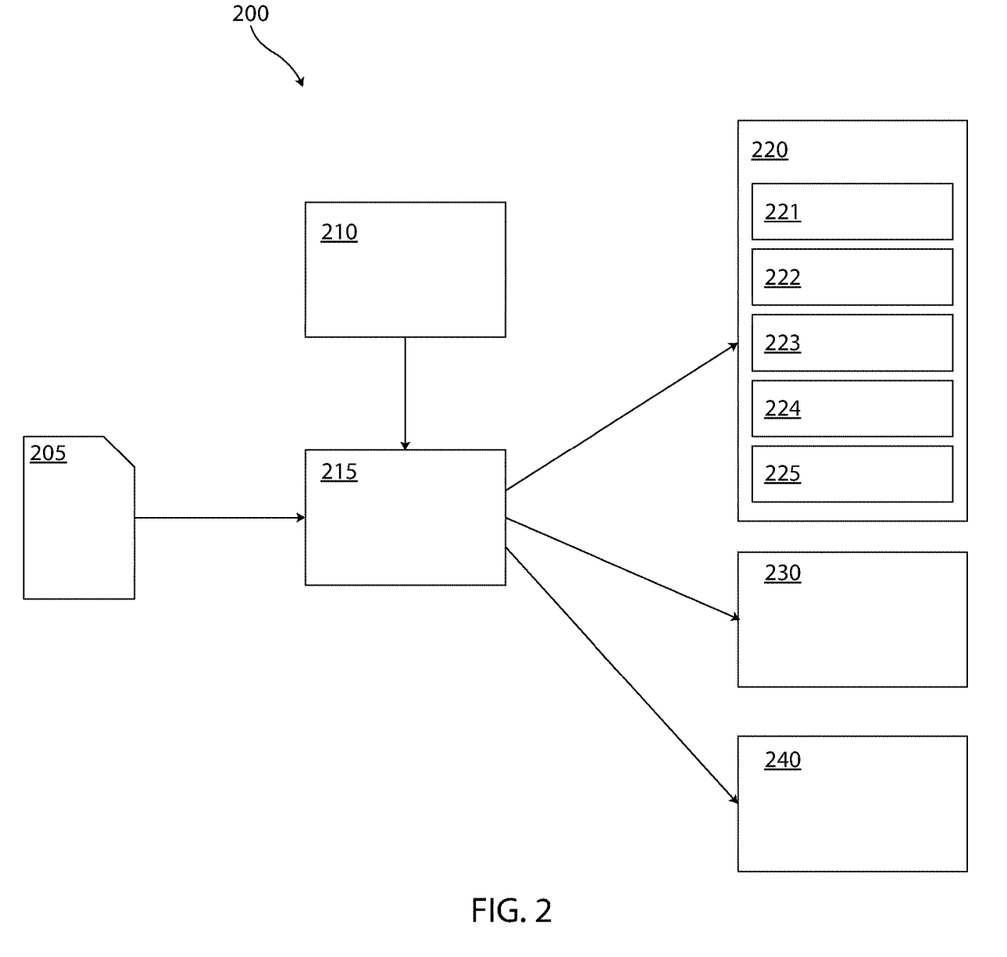
FIG. 2 is an example block diagram of a process for creating a digital interaction database.

For example, a first digital interaction in one of the first person of interest data sets and a second digital interaction in one of the second person of interest data sets can be linked such as, for example, in the data set directory 240. For example, the first digital interaction may include a history of phone records between the first person of interest and a number of other people. If one of these other people includes the second person of interest, the digital interaction (e.g., the phone call between the two) in the first person of interest data sets and the digital interaction in the second person of interest data sets can be linked. As another example, the first digital interaction may include a history of messages (e.g., text, SMS, messenger, WhatsApp, WeChat, etc.) between the first person of interest and a number of other people. If one of these other people includes the second person of interest, the digital interaction (e.g., the message between the two) in the first person of interest data sets and the digital interaction in the second person of interest data sets can be linked.

Two digital interactions can be linked in a number of different ways. As one example, the first person of interest data 115 may include a first phone number. An algorithm executing on a process (e.g., in the cloud) may search all or most digital interactions within all digital interaction data sets (e.g., other than the person of interest associated with the first phone number) for phone calls to or from the first phone number. This can be done for each phone number, messenger ID, email address, etc. associated with the first person of interest and or stored in the first person of interest data 115. This may also be done for each person of interest.

As another example, each digital interaction associated with one person of interest may be compared with each digital interaction associated with another person of interest. If a correlation is found, a link between the two digital interactions may be created. For example, an algorithm may select a first digital interaction from a first digital interaction data set. An identifier (e.g., phone number, email address, Id, username, etc.) associated with the first digital interaction may be extracted. This identifier may then be used to search all or most digital interactions within all digital interaction data sets for the identifier. If an intersection is found between the identifier and another digital interaction, then a link between the digital interactions can be made.

A link between digital interactions, for example, shows that a digital interaction occurred between the two persons of interest. This digital interaction may also be associated with duration data, the direction of the digital interaction, the location of the sender or the receiver, and/or content of the digital interaction, etc.

FIG. 2 is an example block diagram of a processing structure 200 for creating a digital interaction database.

One or more input files 205 can be processed with processor 215 using mapping definition 210 into one or more digital interaction data sets 230 and/or one or more digital interaction data set descriptors 220.

Figure 6:
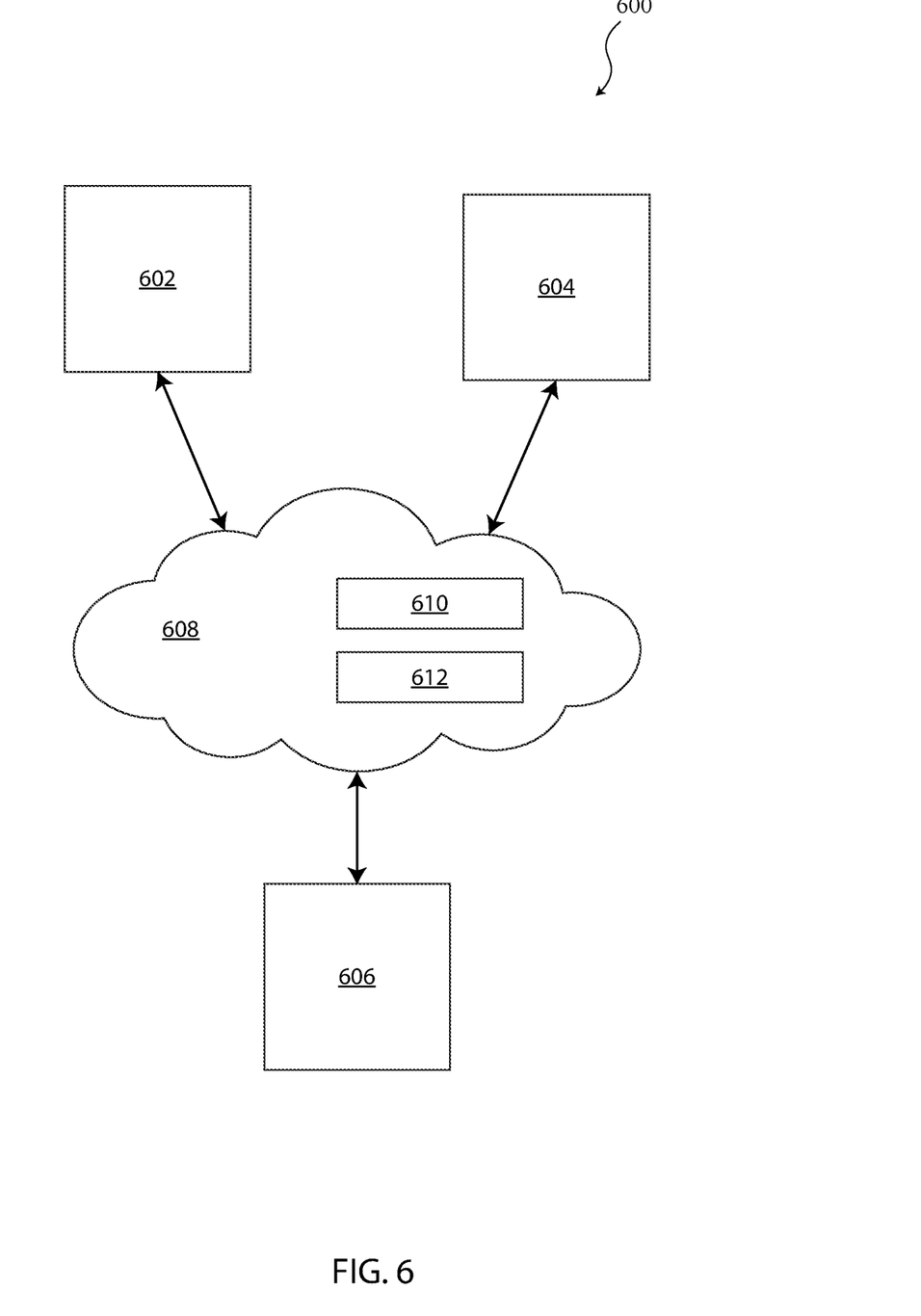
FIG. 6 is a block diagram of a computational system that can be used with or to perform some examples described in this document.

The processor 215 may include any or all elements of the computational system 600. The processor 215 may be a cloud based processor with one or more dedicated and/or remote processors. The processor 215 may operate on one or more digital interaction data sets.

The processor 215 may include a plurality of processors. Each processor 215 of the plurality of processors may process a specific type of input file 205. For example, a first processor may process Verizon phone records. A second processor, for example, may process Facebook records. A third process, for example, may process AT&T phone records. A fourth processor, for example, may process messaging records. Various other specific processors may also be used.

The processor 215 may process the input file 205 based on a mapping definition 210. The mapping definition 210 may define transformations for each field in a specific input file 205 to one or more digital interaction data sets 230. The mapping definition 210 may define how the processor 215 maps data from one or more input file 205 to data in one or more digital interaction data sets 230.

The processor 215, for example, may create a single digital interaction data set 230 from a single input file 205 using the mapping definition 210.

The processor 215, for example, may create a plurality of digital interaction data sets 230 from a single input file 205 using the mapping definition 210. For example, an input file 205 from a wireless carrier such as, for example, AT&T, may include phone data, text data, and Internet data access records in a single input file 205. Each of these data may be mapped into one or more digital interaction data sets 230. As another example, a Google input file 205 may include email data, photo data, GPS data, search history data, IP data list, device access data, etc. Each of these may be mapped into one or more digital interaction data sets 230.

The processor 215, for example, may create a single digital interaction data sets 230 from a plurality of input files 205 using the mapping definition 210. For example, an input file 205 from a wireless carrier such as, for example, Verizon, may require a phone input file 205, a text input file 205, and/or a cell tower input file 205. Two or more of these input file 205 may be mapped into a single digital interaction data sets 230.

For example, each digital interaction data sets 230 may include a JSON File (or a JSON Lines file or an XML, file or the like) where each row includes a data item transformed (or mapped) from the input file 205 and/or described by the digital interaction data set descriptors 220. Each data item, for example, may include a JSON object composed of key/value pair data. A value may be complex such as a location feature or a simple value such as a string, number, date, etc. A key/value pair, for example, may include the following data: data source, data type, provider, date produced, number or account of interest, date of production, date of processing, etc.

The processor 215, for example, may produce a digital interaction data set descriptor 220. The digital interaction data set descriptor 220, for example, may be stored in a cloud database. The digital interaction data set descriptor 220, for example, may describe various components of a digital interaction data set. The digital interaction data set descriptor 220, for example, may include data set metadata 221, data set metadata key info 222, data item key info 223, data item key characterization 224, and/or data item key connectors 225.

The data set metadata 221 may include information about the digital interaction data sets 230 such as, for example, specifics for each key/value pair in the digital interaction data set 230, the type of data, account number, subscriber phone number, a social media id, an account number, email address, name, what processor was used, phone number(s), dates, the source of an associated digital interaction data sets 230, the date the data was uploaded, whether the data is a "special" type, the connections between fields that describe interactions, etc. As another example, the digital interaction data set descriptor 220 may include specific meta-data derived from the input file 205 such as the, etc.

The data set metadata key info 222, for example, may describe the type of information contained in each key/value field for the digital interaction data set. For example, if the data is considered an important type, a category can be set that allows the field to be used generically. The data set metadata key info 222, for example, may describe the columns of the digital interaction data sets 230. The data set metadata key info 222, for example, may include information about what the keys in the Data Set Meta Data mean.

The data item key info 223, for example, may describe the data for use and display for each key/value in the digital interaction data set. The data item key info 223 may also identify the special usable types for more generic use by the tools such as, for example, a phone number, email address, social media id, account number, location information, etc. The data item key info 223, for example, describes the fields in the data item. As another example, the data item key info 223, may identify whether the data a special type of data. As another example, the data item key info 223, may include a title for columns in a list tool, the source column name and/or the units for each column.

The data item key characterization 224, for example, may include statistics about a digital interaction data set 230. For example, the data item key characterization 224 may include statistics or enumeration for each column, the type of data (e.g., strings, integers, dates, phone numbers, etc.), ranges, etc., etc.

The data item key connectors 225, for example, may define connections between data sets and/or interactions between two type of fields. This may include, for example, to-from relationships such as, between two callers (e.g., caller number and called number), between senders and receivers of messages or emails (e.g., message sender and message receiver), etc. The data item key connectors 225, for example, may label the type of interaction such as, for example, "CALL", "MESSAGE", "COMMENT", "MONEY" etc.

A data item key connector 225 may be a connection between a first individual and a second individual based on common data within the corresponding first person of interest data set(s) and the second person of interest data set(s). For example, a data item key connector 225 may include a phone call between the first individual and a second individual. As another example, a data item key connector 225 may include a text message, SMS message, Facebook Messenger message, WeChat message, WhatsApp message, etc. between the first individual and the second individual. As another example, a data item key connector 225 may include a social media post or comment between the first individual and the second individual. As another example, a data item key connector 225 may include a GPS location of the first individual overlapping with the GPS location of the second individual. As another example, a data item key connector 225 may include a financial transaction, a money transfer, a loan, a payment, etc. between the first individual and the second individual. As another example, a data item key connector 225 may include a license plate tracker or a GPS tracker.

The processor 215, for example, may also update a data set directory 240. The processor 215 may extract directory information associated with each digital interaction data sets 230. The data set directory 240 may include a list of contacts from an email archive, friends from a social media file (e.g., Facebook file), or phone numbers from source files, etc. that can be used to associate the identifier to a specific individual (or alias). A single data set directory 240 may include directory information from a plurality of digital interaction data sets 230.

For example, an AT&T input file 205 may include calls, text messages, and data access records (e.g., internet browsing) that can be mapped by the processor 215 into three separate digital interaction data sets 230 and digital interaction data set descriptors 220.

As another example, a Verizon (or Sprint) input file 205 may include multiple data files that can be mapped into one or more digital interaction data sets 230.

As another example, a Facebook input file 205 may include one or more files that include messages, wall posts, status updates, pictures, IP History, etc. that may be mapped into one or more digital interaction data sets 230 and/or one or more digital interaction data set descriptors 220.

As another example, a Google input file 205 may include one or more files that include messages (with or without message content), contacts, emails, photos, GPS data, search history data, IP data, device access list data, etc. that may be mapped into one or more digital interaction data sets 230 and/or one or more digital interaction data set descriptors 220.

As another example, an Apple input file 205 may include one or more files that include email, iMessages (with or without content), photos, photos, GPS data, search history data, IP data, device access list data, contacts, etc. that may be mapped into one or more digital interaction data sets 230 and/or one or more digital interaction data set descriptors 220.

As another example, a phone scrape file (e.g., from Cellbrite) may include one or more files that include app data, location data, email data, text data (with or without content), phone data, IP data, device access list data, contacts, that may be mapped into one or more digital interaction data sets 230 and/or one or more digital interaction data set descriptors 220.

As another example, an advertising aggregator input file 205 may include ID tracking data with GPS data that may be mapped into one or more digital interaction data sets 230 and/or one or more digital interaction data set descriptors 220.

As another example, a GPS tracker file (e.g., ankle, car, etc.) may include a list of GPS data associated with a date and time that may be mapped into one or more digital interaction data sets 230 and one or more digital interaction data set descriptors 220.

As another example, a license plate tracker file may include a listing of license plate images or license plate numbers/letters that were recorded at specific location (e.g., the location may be identified by GPS data) with a specific time stamp.

One or more digital interactions within the digital interaction database may include a number of data items. For example, these data items may include a date of the digital interaction, a time of the digital interaction, an identifier associated with the sender of the digital interaction, and/or an identifier associated with the receiver(s) of the digital interaction, the content of the interaction, the duration of the interaction, etc. These digital interactions may be linked in the data set directory 240.

The digital interaction database, for example, can include a third digital interaction data set, a fourth digital interaction data set, a fifth digital interaction data set, etc. The digital interactions in the digital interaction database may include interactions between two or more individuals from the various digital interaction data sets.

Figure 3:
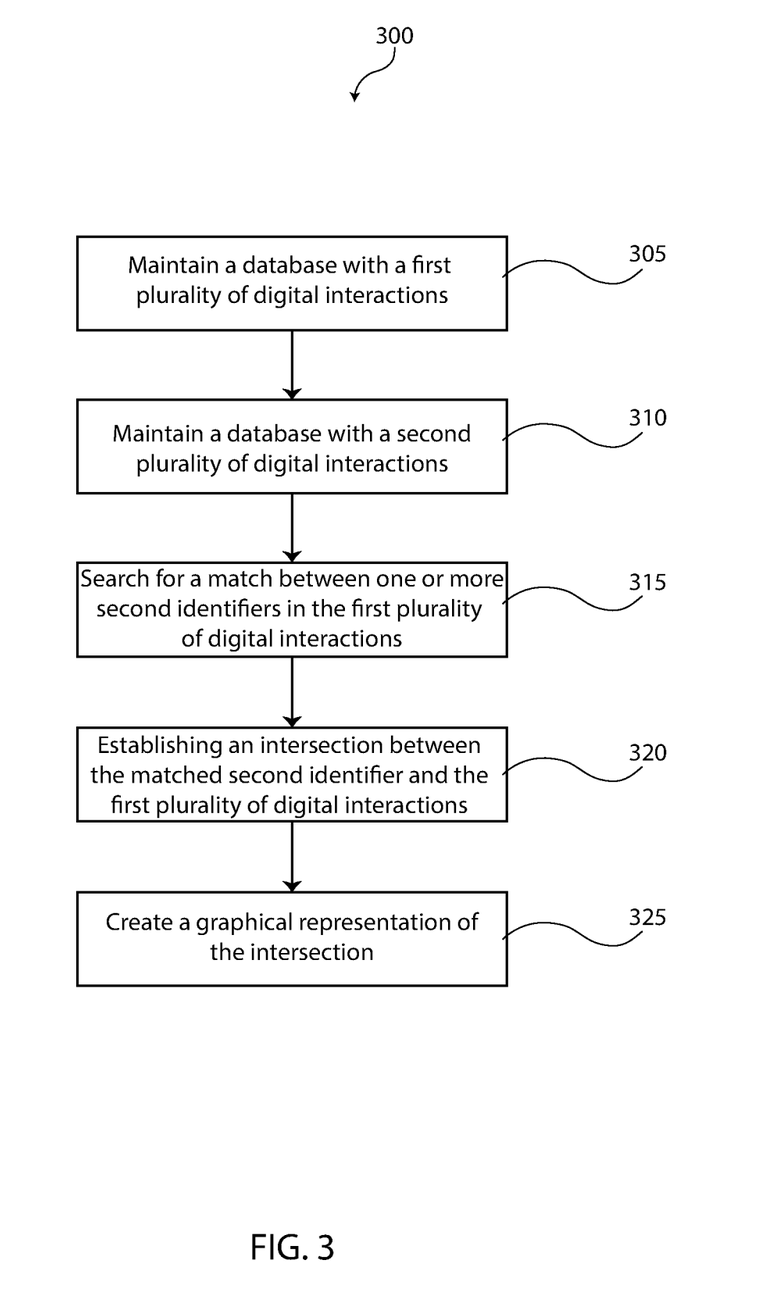
FIG. 3 is an example flowchart of a process for providing a forensic digital interaction database and/or viewer.

FIG. 3 is an example flowchart of a process 300 for providing a subject filtering tool for a digital interaction database. The blocks of process 300 may occur in any order. Additional blocks may be added to process 300. Some blocks may be removed, skipped, or modified. The process 300 may be executed by computational system 600 and/or cloud computing system 600.

At block 305 a first plurality of digital interactions may be maintained in a digital interaction database (e.g., the first digital interaction data set 120 and/or the first digital interaction data set 125 and/or the second digital interaction data set 145 and/or the second digital interaction data set 150). The first plurality of digital interactions, for example, may include a first plurality of digital records of interaction between a first identifier associated with a first individual and a first plurality identifiers associated with a first plurality of individuals. The first plurality of digital records may have been recorded by a first provider.

At block 310 a second plurality of digital interactions may be maintained in a digital interaction database (e.g., the first digital interaction data set 120 and/or the first digital interaction data set 125 and/or the second digital interaction data set 145 and/or the second digital interaction data set 150). The second plurality of digital interactions, for example, may include a second plurality of digital records of interaction between a second identifier associated with a second individual and a second plurality identifiers associated with a second plurality of individuals. The first plurality of digital records may have been recorded by a first provider. The second plurality of digital interactions may have been recorded by a second provider. The second provider, for example, may be different and/or distinct from the first provider. The second provider, for example, may be the same as the first provider.

For example, the first plurality of digital interactions and/or the second plurality of digital interactions may include a listing of keywords (or phrases) of interest (e.g., location specific gang related words, crime specific words, names of victims, names of suspects, location names, etc.). The listing of keywords may be entered by a user and/or stored in memory.

For example, the first plurality of digital interactions and/or the second plurality of digital interactions may include a listing of locations such as, for example, GPS points, geofenced boundaries, etc.

An additional plurality of digital interactions, for example, may be used that are similar to or different from either or both the first plurality of digital interactions and the second plurality of digital interactions.

For example, the first plurality of digital interactions and/or the second plurality of digital interactions may include cell phone records, text message records, email records, social media records, messenger records, WhatsApp records, Snapchat records, financial transaction records, GPS tracker data, mobile phone GPS data, license plate data, store receipt data, government registration data (e.g., DMV records, board registration records, professional license records, etc.), store receipts, etc.

The first provider and/or the second provider, for example, may include a mobile phone carrier (e.g., Verizon, AT&T, T-Mobile, Sprint, etc.), a social media company (e.g., Facebook, LinkedIn, Snapchat, Instagram, TikTok, etc.), a messaging company (e.g., messenger, WhatsApp, WeChat, iMessage, Messages, etc.), a mobile phone provider (e.g., Android, Apple, etc.), a map company (e.g., Google Maps, Apple Maps, etc.), an advertising id tracking company (e.g., Babel X), etc.

At block 315, a search for an intersection between a second identifier of the second plurality of digital interactions and an identifier of the first plurality of digital interactions may be performed. The search, for example, may include searching for the second identifier in the first plurality of digital interactions or an identifier similar to the second identifier in the first plurality of digital interactions. The search for an intersection between the second identifier and an identifier of the first plurality of digital interactions may include searching within a selected time period such as, for example, a preset time period or a user-entered time period. The selected time period, for example, may include the time period between the first data entry and the last data entry within first data set and/or between the first interaction of the first plurality of digital interactions and the last interaction of the first plurality of digital interactions.

For example, if the first plurality of digital interactions comprises a plurality of incoming phone calls and outgoing phone calls from a phone associated with the first identifier and the second identifier comprises a second phone number, the search may include comparing the second identifier of the second plurality of digital interactions with the incoming phone calls and the outgoing phone calls.

As another example, if the first plurality of digital interactions comprise a plurality of incoming text messages and outgoing text messages from a device associated with the first identifier and the second identifier comprises a second phone number, the search may include comparing the second identifier of the second plurality of digital interactions with the incoming text messages and the outgoing text messages.

As another example, if the first plurality of digital interactions may comprise the content of a plurality of text messages to or from a device associated with the first identifier and the second identifier of the second plurality of digital interactions comprises one or more keywords, the search may include comparing the one or more keywords with the content of the text messages.

As another example, if the first plurality of digital interactions may comprise a plurality of incoming and outgoing email messages associated with a first email address and the second identifier of the second plurality of digital interactions comprises a second email address, the search may include comparing the second email address with the plurality of incoming and outgoing email messages in the first database.

As another example, if the first plurality of digital interactions may comprise the content of a plurality of email messages associated with a first email address and the second identifier of the second plurality of digital interactions comprises one or more keywords, the search may include comparing the one or more keywords with the content of the email messages.

As another example, if the first plurality of digital interactions comprises a first plurality geolocation tags where each geolocation tag indicates the geolocation and time of the first user (or a first user device) over a period of time and the second identifier of the second plurality of digital interactions comprises a second geolocation tag, the search may compare the second geolocation tag with the first plurality of geolocation tags.

At block 315, for example, each identifier within the second plurality of digital interactions may be used as the second identifier. This may, for example, result in search for a match for each identifier of the second plurality of identifiers in the first plurality of digital interactions.

At block 320, a first digital interaction between the first identifier and the second identifier may be established. The first digital interaction, for example, may include the type of digital interaction, the date of the digital interaction, the time of the digital interaction, the duration of the digital interaction, the content of the digital interaction, the name of the first user associated with the first plurality of identifiers, the name of the second user associated with the second plurality of identifiers, etc.

The first digital interaction, for example, may include a link between he first identifier and the second identifier. A link, for example, may include data connecting the first identifier and the second identifier. The link, for example, may be stored in the digital interaction database. The link, for example, may include data elements that connect the first identifier with the second identifier.

At block 325, a graphical representation of the digital interaction may be created. The graphical representation, for example, may include one or more of HTML, code, images, text, charts, graphics, etc. The graphical representation may include the graphical representation shown in FIG. 4. The graphical representation, for example, may include the type of common values, the number of occurrence of the common values, and the data locations (e.g., data bins, or data records), where the common values can be found.

The graphical representation, for example, may be published to one more users such as, for example, on a webpage, within an application executing on a computer or smartphone, etc.

Process 300 may also allow a user to select the first plurality of digital interactions and the second plurality of digital interactions from a plurality of data sets that each include a plurality of digital interactions. For example, a database may include any number of data sets of digital interactions.

A graphical representation, for example, may be presented to a user allowing the user to select the first plurality of digital interactions and the second plurality of digital interactions from the plurality of data sets. The graphical representation, for example, may be presented to the user to select or enter a selected time period.

A graphical representation, for example, may be presented that lists all or a subset of the digital intersections between the first plurality of digital interactions and the second plurality of digital interactions. The graphical representation, for example, may allow the user to select one of the digital interactions and present the details of the selected digital interaction as part of the graphical representation.

As another example, the graphical representation, for example, may allow the user to filter all or a subset of the digital interactions between the first plurality of digital interactions and the second plurality of digital interactions. The filter, for example, may include filtering based on the sender, receiver, contacts, distance, duration, location, start time, end time, forwarded, username, record type, etc.

Figure 4:
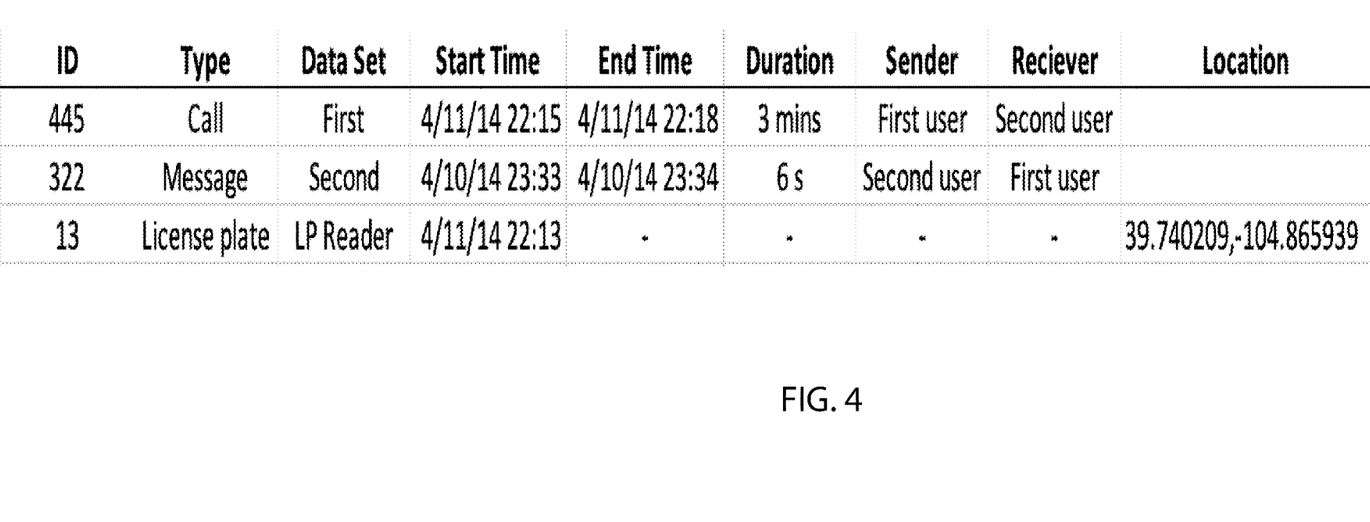
FIG. 4 is a graphical representation of a digital interaction between a one or more identifiers in a first plurality of identifiers and one more identifiers in a second plurality of identifiers.

FIG. 4 is a graphical representation of a digital interaction between a one or more identifiers in a first plurality of identifiers and one more identifiers in a second plurality of identifiers. In this example, the three graphical representation of digital interactions are shown: phone call, text message, and license plate tracking. In this example, the graphical representation includes a digital interaction ID, digital interaction type, the digital interaction data set where the date is retrieved, the start time of the digital interaction, the end time of the digital interaction, the duration of the digital interaction, the sender of the digital interaction, the receiver of the digital interaction, and a location where the digital interaction occurred. Various other data may be presented.

As another example, the graphical representation may include a tabular display of the digital interaction between a one or more identifiers in a first plurality of identifiers and one more identifiers in a second plurality of identifiers.

Various other graphical representations of a digital interaction between two different identifiers may be created and/or displayed to a user.

Figure 5:
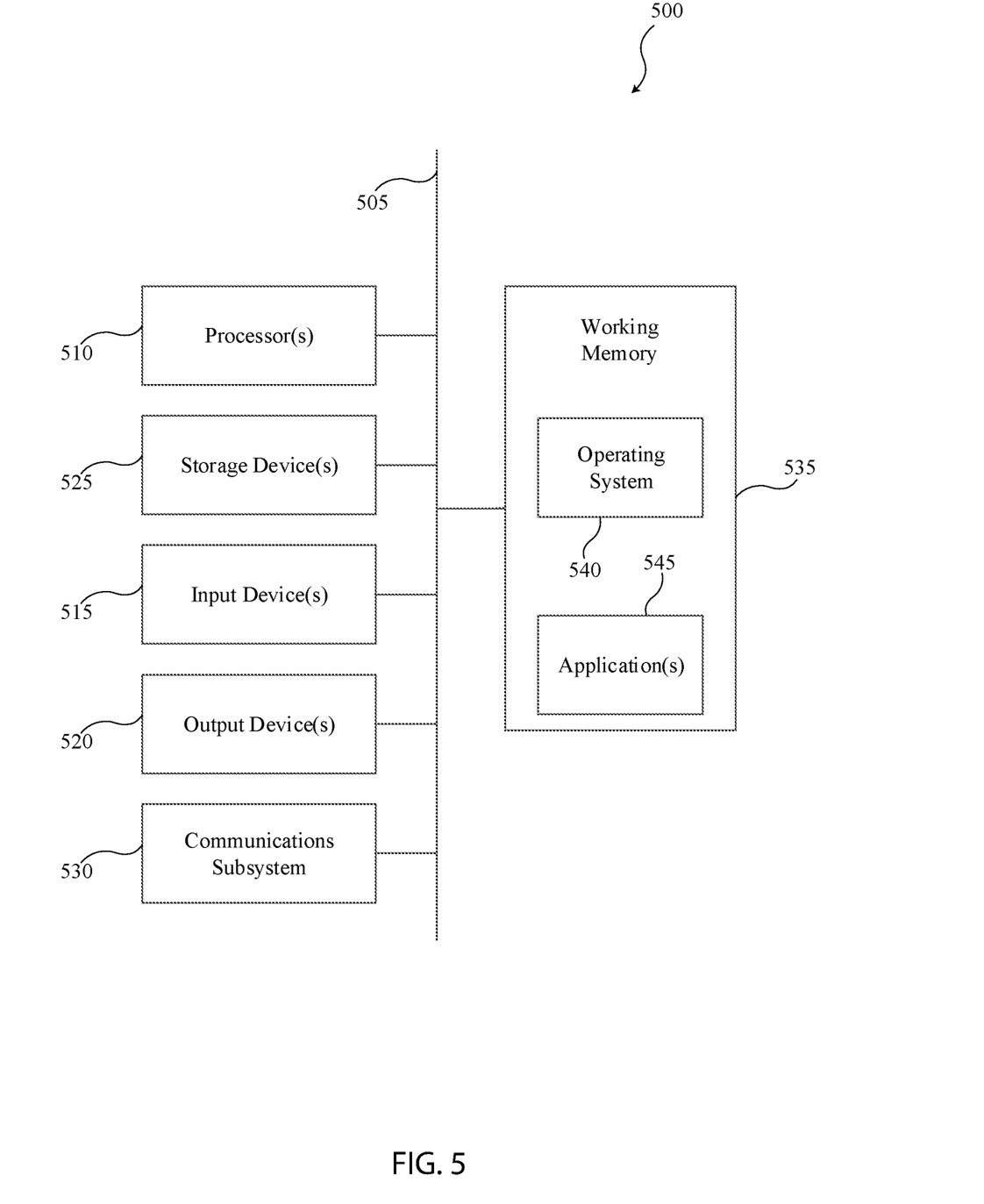
FIG. 5 illustrates an example cloud computing system.

The computational system 500, shown in FIG. 5 can be used to execute process 300 or any other process described within this document. As another example, computational system 500 can perform any calculation, identification, matching, storing, processing, creating, displaying, providing, and/or determination described in this document. Computational system 500 includes hardware elements that can be electrically coupled via a bus 505 (or may otherwise be in communication, as appropriate). The hardware elements can include one or more processors 510, including without limitation one or more general-purpose processors and/or one or more special-purpose processors (such as digital signal processing chips, graphics acceleration chips, and/or the like); one or more input devices 515, which can include without limitation a mouse, a keyboard and/or the like; and one or more output devices 520, which can include without limitation a display device, a printer and/or the like.

The computational system 500 may further include (and/or be in communication with) one or more storage devices 525, which can include, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computational system 500 might also include a communications subsystem 530, which can include without limitation a modem, a network card (wireless or wired), an infrared communication device, a wireless communication device and/or chipset (such as a Bluetooth device, an 802.6 device, a Wi-Fi device, a WiMax device, cellular communication facilities, etc.), and/or the like. The communications subsystem 530 may permit data to be exchanged with a network (such as the network described below, to name one example), and/or any other devices described in this document. In many embodiments, the computational system 500 will further include a working memory 535, which can include a RAM or ROM device, as described above.

The computational system 500 also can include software elements, shown as being currently located within the working memory 535, including an operating system 540 and/or other code, such as one or more application programs 545, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 525 described above.

In some cases, the storage medium might be incorporated within the computational system 500 or in communication with the computational system 500. In other embodiments, the storage medium might be separate from a computational system 500 (e.g., a removable medium, such as a compact disc, etc.), and/or provided in an installation package, such that the storage medium can be used to program a general-purpose computer with the instructions/code stored thereon. These instructions might take the form of executable code, which is executable by the computational system 500 and/or might take the form of source and/or installable code, which, upon compilation and/or installation on the computational system 500 (e.g., using any of a variety of generally available compilers, installation programs, compression/decompression utilities, etc.) then takes the form of executable code.

FIG. 6 illustrates an example cloud computing system 600. The cloud computing system 600, for example, includes clients 602, 604, and 606 connected to a computing cloud 608. The computing cloud 608, for example, includes processing unit 610 and data storage unit 612, both of which are accessible to clients 602, 604, and 606.

The computing cloud 608, the clients 602, 604, and 606, and/or the data storage unit 612 may include one or more or all of the components of computational system 600.

The computing cloud 608, for example, may be capable of both storing information and performing data functions on information. The computing cloud 608 includes at least one computer that is accessible from a remote location. The computing cloud 608, for example, may include a plurality of storage devices that will be referred to as collectively the data storage unit 612, as well as a plurality of processing units that will be referred to collectively as the processing unit 610. The computing cloud 608, for example, may include hardware that is cost prohibitive to deploy and maintain at individual clients 602, 604, and 606. The computing cloud 608, for example, may include software that is cost prohibitive to install, deploy, and maintain at individual computing clouds. The computing cloud 608 may, for example, may provide this hardware and software through secure connections to the clients 602, 604, and 606. While there is one computing cloud 608 shown in FIG. 6, it is explicitly understood that a plurality of clouds may be consistent with this disclosure. It is understood that the disclosed historian system can collect, store, and retrieve data for multiple clients, multiple systems within a single client, as well as multiple systems located within multiple clients.

The clients 602, 604, and 606 may include individual computers, tablets, or mobile devices that are in communication with the computing cloud 608. The clients 602, 604, and 606 are capable of accessing both the processing unit 610 and data storage unit 612 that are located in the computing cloud 608. The clients 602, 604, and 606 are able to access both local processes as well as information from the computing cloud 608. The clients 602, 604, and 606 may comprise a plurality of manufacturing tools and sensors to monitor the manufacturing tools. These sensors may detect any operational condition of the manufacturing tools, including, but not limited to, the temperature, vibration, or other measurable operating parameter.

The clients 602, 604, and 606 communicate with the computing cloud 608 through any secured or unsecured method, including Hypertext Transfer Protocol Secure (HTTPS), secure telnet, or file transfer protocol secure (FTPS). Secure methods, for example, may be preferred over unsecure methods, and that the particular method chosen will depend upon the requirements of the function being accessed. This document should not be interpreted as being limited to any particular protocol or method of transferring data. Various other data transfer protocols may be used.

Unless otherwise specified, the term "substantially" means within 5% or 10% of the value referred to or within manufacturing tolerances. Unless otherwise specified, the term "about" means within 5% or 10% of the value referred to or within manufacturing tolerances.

The conjunction "or" is inclusive.

The terms "first", "second", "third", etc. are used to distinguish respective elements and are not used to denote a particular order of those elements unless otherwise specified or order is explicitly described or required.

Numerous specific details are set forth to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained in software to be used in programming or configuring a computing device.

Embodiments of the methods disclosed may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A computer implemented method for forensic criminal investigation, the method comprising:
   maintaining in a digital interaction database a first plurality of digital records of interaction between a first identifier associated with a first individual and a first plurality identifiers associated with a first plurality of individuals, the first plurality of digital records having been recorded by a first provider, each of the first plurality of digital records including a plurality of data elements;
   maintaining in the digital interaction database a second plurality of digital records of interaction between a second identifier associated with a second individual and a second plurality of identifiers associated with a second plurality individuals, the second plurality of digital records having been recorded by a second provider, the second provider being different and distinct from the first provider, each of the second plurality of digital records of interactions including a plurality of data elements;
   searching for an interaction between a data element of the first plurality of digital records and a data element of the second plurality of digital records;
   establishing a first digital interaction between the first individual and the second individual based on an interaction between the data element of the first plurality of digital records and the data element of the second plurality of digital records; and
   creating a graphical representation comprising information about the first digital interaction between the first individual and the second individual.

2. The method according to claim 1, further comprising:
   establishing a second digital interaction between the first individual and the second individual based on an intersection between the second identifier and an identifier of the first plurality of identifiers, wherein the second digital interaction is a different type of digital interaction; and
   creating a graphical representation comprising information about the second digital interaction that includes the type of digital interaction of the second digital interaction.

3. The method according to claim 1, wherein the information about the first digital interaction comprises information selected from the group consisting of a. first digital interaction type, a first digital interaction duration, time of the first digital interaction, the second identifier, the first identifier, and first digital interaction location.

4. The method according to claim 1, wherein the first digital interaction comprises a digital interaction selected from the group consisting of phone call, a text message, an text message, an email, an instant message, and a Facebook message.

5. The method according to claim 1, wherein the first plurality of digital records is organized differently than the second plurality of digital records.

6. The method according to claim 1, wherein the first plurality of digital records includes data that is not included in the second plurality of digital records.

7. The method according to claim 1, wherein the first plurality of digital records or the second plurality of digital records comprises cell phone records.

8. The method according to claim 1, wherein the first plurality of digital records or the second plurality of digital records comprises social media records.

9. The method according to claim 1, wherein the first plurality of digital records or the second plurality of digital records includes a plurality of records, each of the plurality or records including one or more of the following: an interaction date, an interaction time, a sender name, a sender ID, a sender phone number, a sender email address, a sender username, a receiver name, a receiver ID, a receiver phone number, a receiver email address, a receiver username, a GPS location of the sender, a GPS location of the receiver, a tower location of the sender, a tower location of the receiver, a tower identifier of the sender, a tower identifier of the receiver, and interaction content.

10. A computing cloud for forensic criminal investigation comprising at least one data storage unit and at least one memory device configured to store instructions and at least one computer processing unit configure to execute the instructions, wherein the computing cloud:
   maintains in a digital interaction database stored in the data storage unit a first plurality of digital records a first plurality of digital records of interaction between a first identifier associated with a first individual and a first plurality identifiers associated with a first plurality of individuals, the first plurality of digital records having been recorded by a first provider;

maintains in the digital interaction database a second plurality of digital records a second plurality of digital records of interaction between a second identifier associated with a second individual and a second plurality of identifiers associated with a second plurality individuals, the second plurality of digital records having been recorded by a second provider, the second provider being different and distinct from the first provider;

search for an intersection between the second identifier and an identifier in the first plurality of identifiers;

establish a first digital interaction between the first individual and the second individual based on an intersection between the second identifier and an identifier of the first plurality of identifiers; and create a graphical representation comprising information about the first digital interaction between the first individual and the second individual.

11. The computing cloud according to claim 10, wherein the information about the first digital interaction comprises information selected from the group consisting of a. first digital interaction type, a first digital interaction duration, time of the first digital interaction, the second identifier, the first identifier, and first digital interaction location.

12. The computing cloud according to claim 10, wherein the first digital interaction comprises a digital interaction selected from the group consisting of phone call, a text message, an text message, an email, an instant message, and a Facebook message.

13. The computing cloud according to claim 10, wherein the first plurality of digital records is organized differently than the second plurality of digital records.

14. The computing cloud according to claim 10, wherein the first plurality of digital records includes data that is not included in the second plurality of digital records.

15. The computing cloud according to claim 10, wherein the first plurality of digital records or the second plurality of digital records comprises cell phone records.

16. The computing cloud according to claim 10, wherein the first plurality of digital records or the second plurality of digital records comprises social media records.

17. The computing cloud according to claim 10, wherein the first plurality of digital records or the second plurality of digital records includes a plurality of records, each of the plurality or records including one or more of the following: an interaction date, an interaction time, a sender name, a sender ID, a sender phone number, a sender email address, a sender username, a receiver name, a receiver ID, a receiver phone number, a receiver email address, a receiver username, a GPS location of the sender, a GPS location of the receiver, a tower location of the sender, a tower location of the receiver, a tower identifier of the sender, a tower identifier of the receiver, and interaction content.

18. A computer implemented method for forensic criminal investigation, the method comprising:

receiving a selection of a first plurality of digital records of interaction between a first identifier associated with a first individual and a first plurality identifiers associated with a first plurality of individuals, the first plurality of digital records having been recorded by a first provider, each of the first plurality of digital records including a plurality of data elements;

receiving a selection of a second plurality of digital records of interaction between a second identifier associated with a second individual and a second plurality of identifiers associated with a second plurality individuals, the second plurality of digital records having been recorded by a second provider, the second provider being different and distinct from the first provider, each of the second plurality of digital records of interactions including a plurality of data elements;

establishing one or more digital interactions between a data element of the first plurality of digital records and a data element of the second plurality of digital records; and creating a graphical representation of the one or more digital interactions.

19. The computer implemented method according to claim 18, further comprising receiving a selection of a time period; and wherein the establishing one or more digital interactions comprises establishing one or more digital interactions that occur with the time selected time period.

* * * * *